US009057180B1

(12) United States Patent
Sewell

(10) Patent No.: US 9,057,180 B1
(45) Date of Patent: Jun. 16, 2015

(54) APPARATUS FOR SEALING A VACUUM TANK DOOR

(75) Inventor: Cody L. Sewell, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 13/434,349

(22) Filed: Mar. 29, 2012

Related U.S. Application Data

(60) Provisional application No. 61/481,600, filed on May 2, 2011.

(51) Int. Cl.
E02F 3/88 (2006.01)
A47L 5/00 (2006.01)
B65F 1/14 (2006.01)

(52) U.S. Cl.
CPC ................ E02F 3/88 (2013.01); E02F 3/8816 (2013.01); B65F 1/1638 (2013.01)

(58) Field of Classification Search
CPC ........... E02F 3/88; E02F 3/8816; E02F 5/003; B65F 1/1638
USPC ........ 220/333, 4.14, 244, 200, 211, 332, 314, 220/582, 260, 344, 252, 331, 263, 262; 37/304, 905, 347, 323; 266/44, 165; 49/255, 205, 248, 339, 199, 340, 208, 49/253, 324; 15/340.1; 298/17 R; 202/250; 175/66, 207; 292/256.6, 256.5; 68/139; 134/22.18
See application file for complete search history.

(56) References Cited

U.S. PATENT DOCUMENTS

| 187,768 | A | * | 2/1877 | Munzinger | 202/247 |
|---|---|---|---|---|---|
| 522,137 | A | * | 6/1894 | Walker | 202/247 |
| 1,311,009 | A | * | 7/1919 | Rinehimer | 220/244 |
| 1,944,976 | A | * | 1/1934 | Hamilton | 55/369 |
| 2,264,216 | A | * | 11/1941 | Milligan | 414/491 |
| 2,556,354 | A | * | 6/1951 | Williamson et al. | 220/323 |
| 2,639,144 | A | * | 5/1953 | Long | 49/246 |
| 2,639,601 | A | * | 5/1953 | Miller | 68/139 |
| 2,734,656 | A | * | 2/1956 | Schonfeld | 220/244 |
| 2,816,683 | A | * | 12/1957 | Miers et al. | 220/314 |
| 2,823,825 | A | * | 2/1958 | Coffman, V | 220/314 |
| 2,867,329 | A | * | 1/1959 | Miller | 210/360.1 |
| 2,927,787 | A | * | 3/1960 | Maher | 49/276 |
| 3,195,761 | A | * | 7/1965 | Coats | 220/211 |
| 3,311,255 | A | * | 3/1967 | Loveless | 220/324 |
| 3,540,618 | A | * | 11/1970 | Jakobsen | 220/211 |
| 3,628,687 | A | * | 12/1971 | Townsend | 220/231 |
| 3,841,676 | A | * | 10/1974 | Hover | 292/256.5 |
| 3,860,142 | A | * | 1/1975 | Jurges | 220/323 |
| 3,888,045 | A | * | 6/1975 | Piegza | 49/255 |
| 3,924,778 | A | * | 12/1975 | Sorensen | 220/314 |

(Continued)

Primary Examiner — Mickey Yu
Assistant Examiner — Gideon Weinerth
(74) Attorney, Agent, or Firm — Tomlinson Rust McKinstry Grable

(57) ABSTRACT

An apparatus for sealing a vacuum tank door. The apparatus comprises a circular flange attached to a door panel of a vacuum tank, a horizontal crossbar connected to the center of the door panel and a lifting assembly. The lifting assembly comprises an upper linkage arm, a lower linkage arm, and a hydraulic cylinder. Activation of the hydraulic cylinder causes the linkage assembly to move downwards pulling on the horizontal crossbar and pulling the vacuum tank door towards the tank. Activation of the hydraulic cylinder also causes a connection point of the lower linkage arm and the upper linkage arm to move over-center of the connection between the lower linkage arm to the to the tank creating a tight seal between the vacuum tank door and the tank.

16 Claims, 9 Drawing Sheets

(56) References Cited

U.S. PATENT DOCUMENTS

| | | | | |
|---|---|---|---|---|
| 4,017,281 A * | 4/1977 | Johnstone | ............ | 55/334 |
| 4,119,238 A * | 10/1978 | Ja'afar et al. | ............ | 220/211 |
| 4,135,640 A * | 1/1979 | MacQuilkin et al. | ............ | 220/316 |
| 4,199,837 A * | 4/1980 | Fisco, Jr. | ............ | 15/302 |
| 4,334,633 A * | 6/1982 | Piegza | ............ | 49/199 |
| 4,518,095 A * | 5/1985 | Engwert | ............ | 220/260 |
| 4,566,375 A * | 1/1986 | van der Schoot | ............ | 99/348 |
| 4,644,874 A * | 2/1987 | Kleykamp | ............ | 105/377.11 |
| 4,669,628 A * | 6/1987 | Hatta | ............ | 220/211 |
| 4,922,571 A * | 5/1990 | Driear | ............ | 15/302 |
| 5,016,717 A * | 5/1991 | Simons et al. | ............ | 175/66 |
| 5,092,963 A * | 3/1992 | Barker et al. | ............ | 202/250 |
| 5,141,528 A * | 8/1992 | Boczkiewicz et al. | ............ | 95/291 |
| 5,191,993 A * | 3/1993 | Wanger et al. | ............ | 220/211 |
| 5,299,370 A * | 4/1994 | Gyori et al. | ............ | 37/347 |
| 5,394,650 A * | 3/1995 | Dean | ............ | 49/386 |
| 5,700,043 A * | 12/1997 | Rohard et al. | ............ | 292/256.6 |
| 5,919,421 A * | 7/1999 | Monz et al. | ............ | 422/566 |
| 5,937,581 A * | 8/1999 | Matye et al. | ............ | 49/279 |
| 5,960,980 A * | 10/1999 | Burke et al. | ............ | 220/325 |
| 6,109,823 A * | 8/2000 | Halferty et al. | ............ | 404/25 |
| 6,182,952 B1 * | 2/2001 | Gutierrez | ............ | 267/64.11 |
| 6,293,051 B1 * | 9/2001 | Matye | ............ | 49/395 |
| 6,438,792 B1 * | 8/2002 | Cappellotto | ............ | 15/315 |
| 6,470,605 B1 * | 10/2002 | Gilman et al. | ............ | 37/323 |
| 6,615,849 B1 * | 9/2003 | Gilman et al. | ............ | 134/22.18 |
| 6,966,724 B2 * | 11/2005 | Robinson | ............ | 404/25 |
| 7,255,039 B2 * | 8/2007 | Halliday et al. | ............ | 99/295 |
| 7,451,521 B2 * | 11/2008 | Cappellotto | ............ | 15/340.1 |
| 7,712,181 B2 * | 5/2010 | Riach | ............ | 15/340.1 |
| 7,802,694 B2 * | 9/2010 | Lee | ............ | 220/582 |
| 7,837,050 B2 | 11/2010 | Maybury, Jr. | | |
| 8,066,140 B1 * | 11/2011 | Young et al. | ............ | 220/263 |
| 8,297,463 B2 * | 10/2012 | McQuaid et al. | ............ | 220/323 |
| 8,360,260 B2 * | 1/2013 | Maybury, Jr. | ............ | 220/314 |
| 8,540,103 B2 * | 9/2013 | Lollis et al. | ............ | 220/324 |
| 8,596,697 B1 * | 12/2013 | Haibel | ............ | 292/256 |
| 8,667,717 B2 * | 3/2014 | Maybury et al. | ............ | 37/323 |
| 8,802,023 B1 * | 8/2014 | Lewis et al. | ............ | 422/296 |
| 2002/0000748 A1 * | 1/2002 | Fuller et al. | ............ | 298/17 R |
| 2004/0108317 A1 * | 6/2004 | Buckner | ............ | 220/263 |
| 2006/0236499 A1 * | 10/2006 | Cappellotto | ............ | 15/340.1 |
| 2010/0064649 A1 * | 3/2010 | Harada et al. | ............ | 56/10.2 R |
| 2010/0320204 A1 * | 12/2010 | Maybury, Jr. | ............ | 220/211 |
| 2010/0325481 A1 * | 12/2010 | Dahan et al. | ............ | 714/10 |
| 2011/0107548 A1 * | 5/2011 | Maybury, Jr. | ............ | 15/340.1 |
| 2011/0296646 A1 * | 12/2011 | Showley | ............ | 15/327.1 |
| 2013/0134163 A1 * | 5/2013 | Maybury, Jr. | ............ | 220/211 |

* cited by examiner

US 9,057,180 B1

APPARATUS FOR SEALING A VACUUM TANK DOOR

CROSS REFERENCE TO RELATED APPLICATION

This application claims the benefit of provisional patent application Ser. No. 61/481,600 filed on May 2, 2011, the entire contents of which are incorporated herein by reference.

FIELD OF THE INVENTION

This invention relates generally to the field of vacuum tanks, and in particular to a method or apparatus for sealing a vacuum tank in a vacuum system.

SUMMARY OF THE INVENTION

The present invention is directed to a sealing mechanism for sealing a vacuum tank. The vacuum tank comprises a door panel having a center point and a tank. The sealing mechanism comprises a circular flange attached to the door panel, a horizontal crossbar connected to and disposed proximate the center point of the door panel, and a lifting assembly attached to the horizontal crossbar. The lifting assembly comprises an upper linkage arm connected to the horizontal crossbar, a lower linkage arm connected to the tank, and a hydraulic cylinder connected to an end of the lower linkage arm. Activation of the hydraulic cylinder causes a connection point of the lower linkage arm and the upper linkage arm to move over-center of the connection between the lower linkage arm to the tank.

In another embodiment of the invention, the sealing mechanism for sealing a vacuum tank door comprises a circular flange attached to a door panel, wherein the circular flange comprises a lip, a horizontal crossbar connected to the lip of the circular flange, and a lifting assembly attached to the horizontal crossbar. The lifting assembly comprises an upper linkage arm connected to the horizontal crossbar, a lower linkage arm connected to the tank, and a hydraulic cylinder connected to an end of the lower linkage arm. Activation of the hydraulic cylinder causes a connection point of the lower linkage arm and the upper linkage arm to move over-center of the connection between the lower linkage arm to the tank.

DESCRIPTION OF THE PREFERRED EMBODIMENTS

Figure 1:
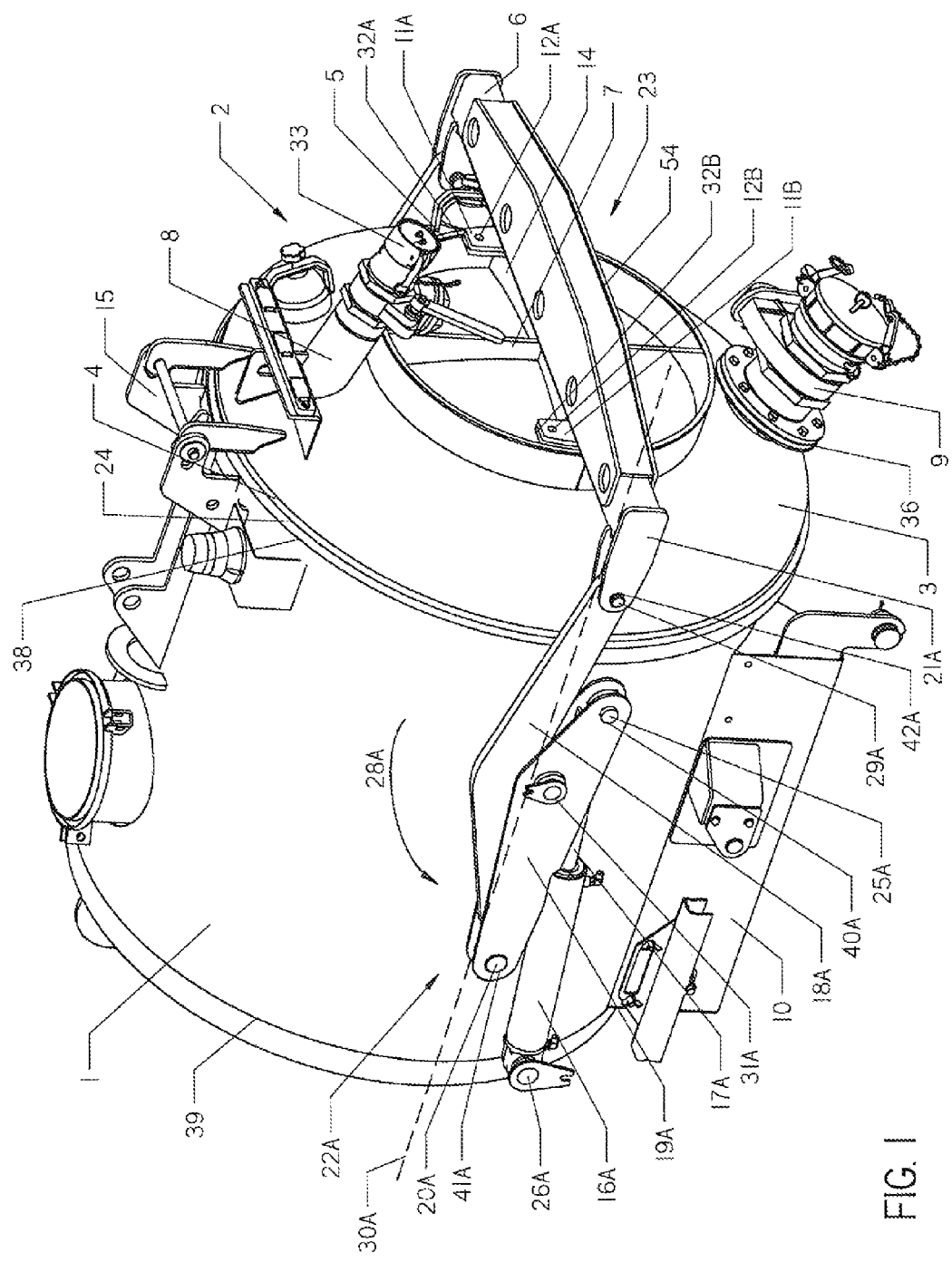
FIG. 1 is a perspective view of the vacuum tank and the closed vacuum tank door. A tank door sealing mechanism is shown attached to the tank door along with a door lifting assembly attached on one side of the tank (an identical attachment exists on the opposite side) to open and close the door.

Turning now to the figures and first to FIG. 1, a vacuum tank 1 is shown that is typically used in combination with other apparatuses to form a vacuum system. FIG. 1 shows the vacuum tank 1 and the systems and methods for sealing the tank door 2 to the tank. The vacuum tank 1 is generally cylindrical, having a first end 38 and a second end 39. The first end 38 of the vacuum tank 1 is generally open-ended and comprises a sealing flange 24 adapted to mate with the tank door 2 when the tank door is engaged with the vacuum tank 1. The second end 39 of the vacuum tank 1 is generally closed at all times. It will, however, be appreciated that the second end 39 of the vacuum tank 1 may support a second tank door (not shown) thus allowing for easy access to the inside of the second end 39 of the vacuum tank 1.

Referring still to FIG. 1, the vacuum tank 1 is shown resting on a mounting bracket 10 which is used in part to keep the tank 1 stable. The vacuum tank 1 may sit on the mounting bracket 10 on a trailer (not shown) in order to transport the vacuum tank 1 to various locations. The mounting bracket 10 is adapted to pivotally connect the tank 1 to a trailer (not shown) so that the tank 1 may be pivoted upward to allow for dumping of the contents contained therein. A hydraulic lifting assembly 50 (FIG. 5) may be disposed under the vacuum, tank 1 and adapted to tilt the second end 39 of the vacuum tank 1 upward to facilitate dumping of the contents.

FIG. 1 shows the vacuum tank door 2 in a closed and sealed position. A sealing mechanism 23, used to seal the door shut, is shown on the face of the tank door 2. The sealing mechanism 23 works to evenly distribute the force placed on the door 2 when the door is in the closed position. Even distribution of the force upon the door ensures an even seal around the periphery of the door 2 and prevents any dimpling or deforming of the door that would compromise the seal. The sealing mechanism 23 comprises a circular flange 5, a vertical bar 7, a horizontal bar 14, and a horizontal crossbar 6. The circular flange 5 may be attached to the face of the door panel 3 such that the ring is evenly spaced from the outer edge of the door panel. The vertical bar 7 and the horizontal bar 14 span the inner diameters of the circular flange 5. The vertical bar 7 and the horizontal bar 14 rigidly attach to the interior of the circular flange 5 to provide structural support to the flange.

Figure 3:
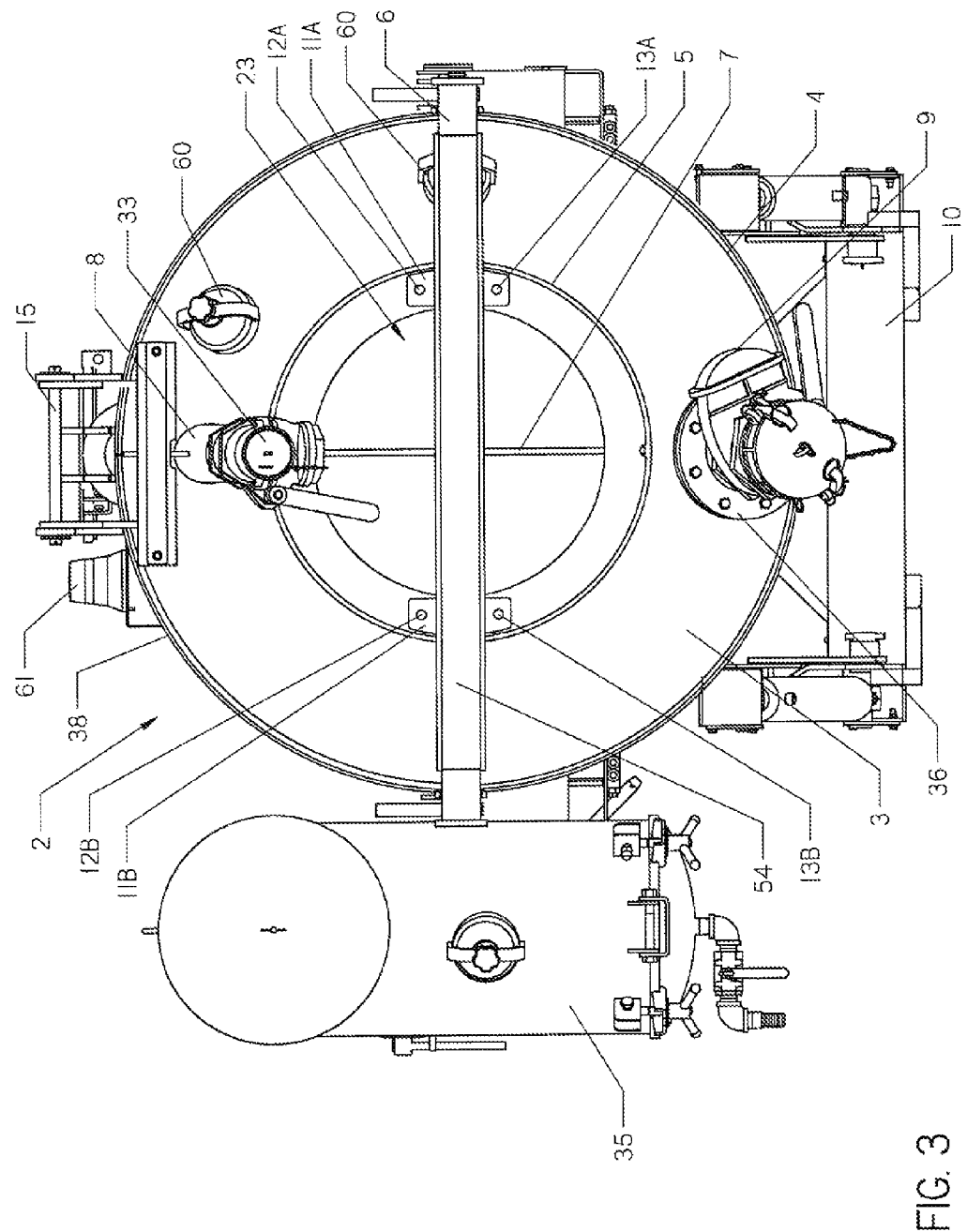
FIG. 3 is a front view of vacuum tank and door of FIG. 1. The door sealing mechanism is shown attached to the tank door. A sediment collector tank is also shown attached to the side of the vacuum tank.

The horizontal crossbar 6 spans the diameter of the circular flange 5 and the tank door 2 as shown in FIGS. 1 and 3. A horizontal crossbar brace 54 covers the crossbar 6 to provide further support. The horizontal crossbar 6 rests directly over the horizontal bar 14 but, as shown in FIG. 1, it may be positioned so it does not touch the horizontal cross bar. The horizontal crossbar 6 connects to the circular flange 5 via brackets 11A, 11B, 32A, and 32B. The brackets 11A and 11B are welded to the horizontal crossbar 6. Brackets 32A and 32B are welded to the interior edges of the circular flange 5 just above the horizontal bar 14. The horizontal crossbar 6 attaches to the circular flange 5 via bolting brackets 11A and 32A together and bolting brackets 11B and 32B together. FIG. 3 shows bolts 12A and 12B connecting the top halves of brackets 11A, 11B, 32A, and 32B together as well as showing bolts 13A and 13B connect the bottom halves of brackets 11A, 11B, 32A, and 32B together. Brackets 32A and 32B are only visible in FIG. 1.

Figure 6:
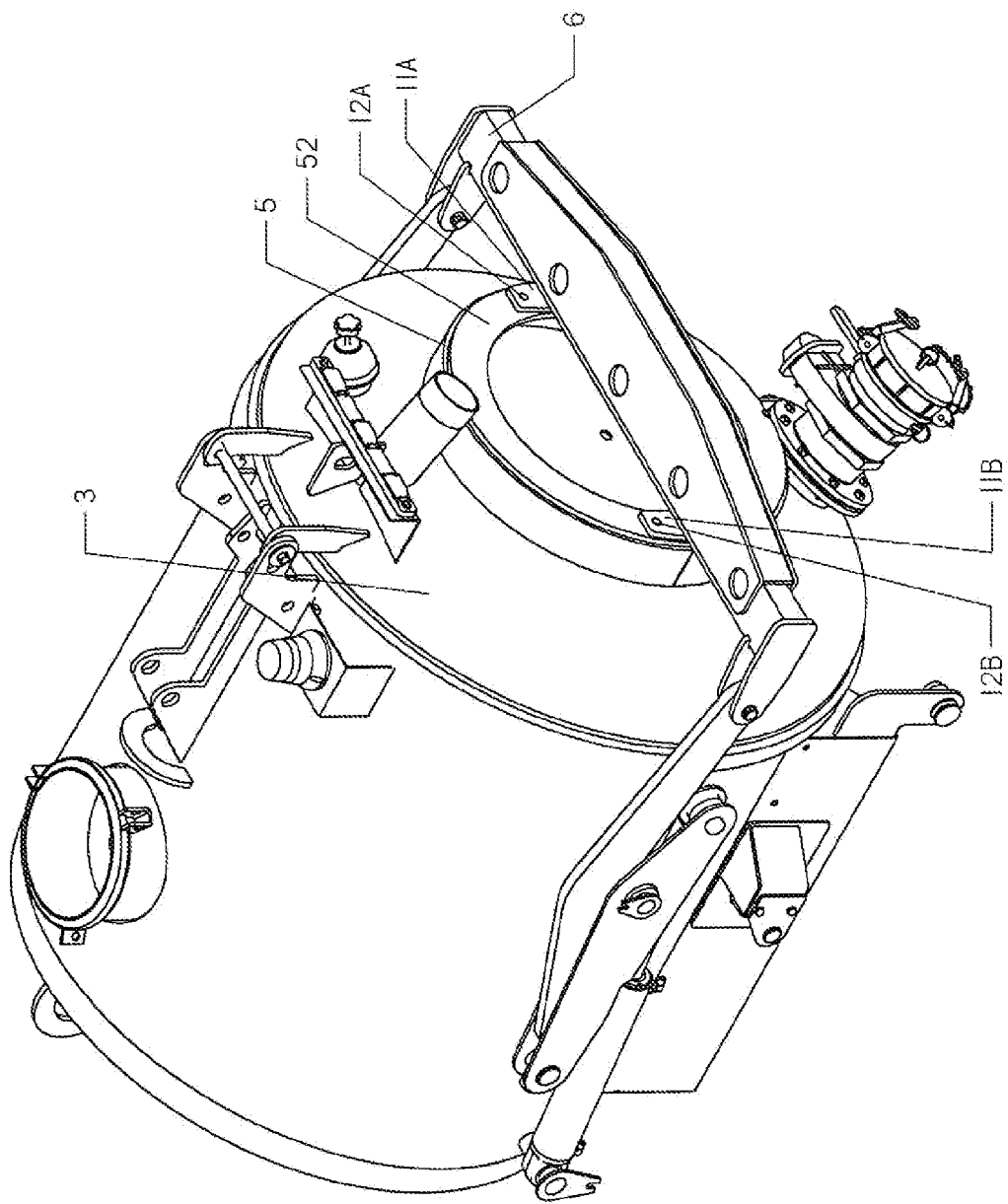
FIG. 6 is a perspective view of the vacuum tank and the closed vacuum tank door with an alternative embodiment of the door sealing mechanism shown in FIG. 1.
Figure 7:
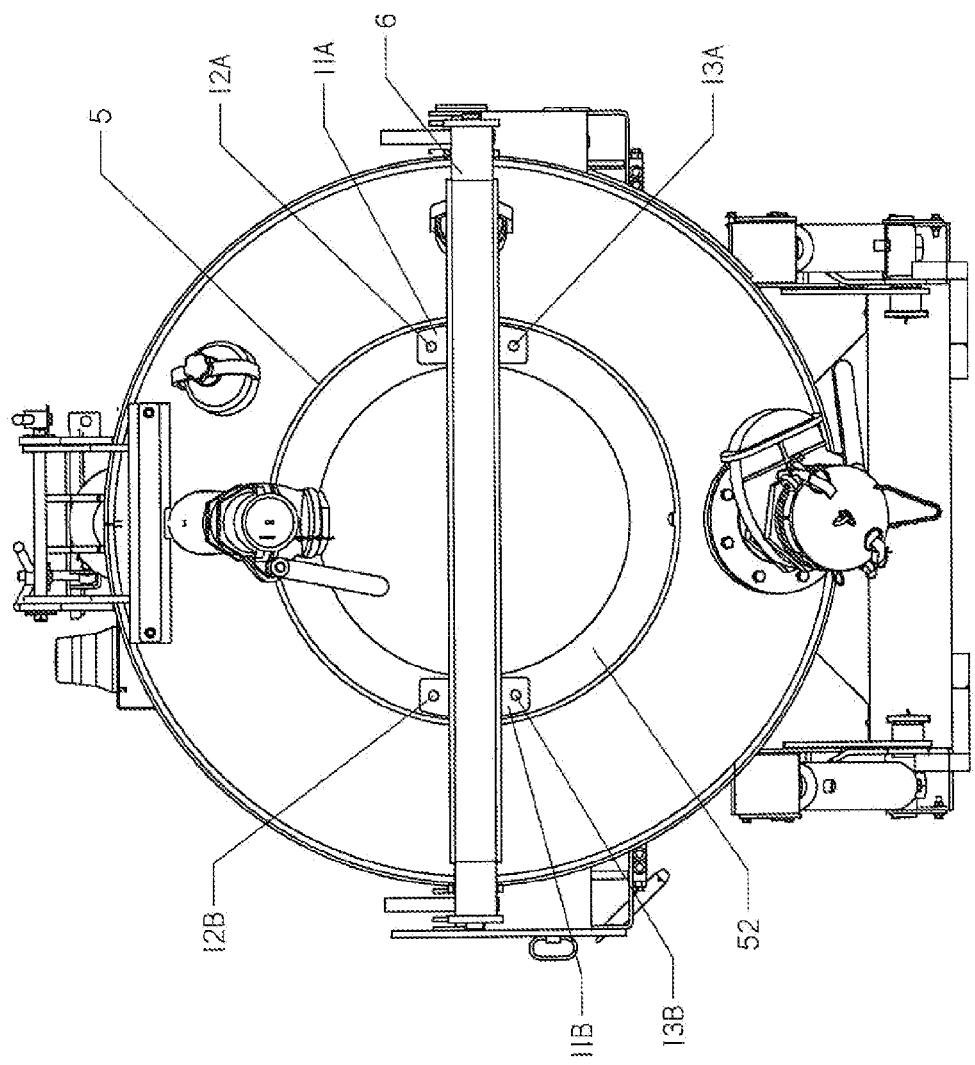
FIG. 7 is a front view of the embodiment of the vacuum tank door shown in FIG. 6.

As shown in FIG. 6, a center circular flange lip 52 may be attached to the circular flange 5 in place of the vertical bar 7 and horizontal bar 14 of FIG. 1. The lip 52 is welded to the top of the circular flange 5 matching the flange's circumference and projects inward. The horizontal crossbar 6 connects to the surface of the circular flange lip 52 on opposite sides via brackets 11A and 11B. Brackets 11A and 11B connect to the outer surface of the lip 52 via bolts 12A and 12B. The brackets are also connected underneath the horizontal crossbar 6 to the lip 52 via bolts 13A and 13B as shown in FIG. 7. The space in the center of the circular flange 5 and the underneath the lip of the flange 52 is completely open exposing the surface of the door panel 3 as seen in FIG. 6.

Figure 8:
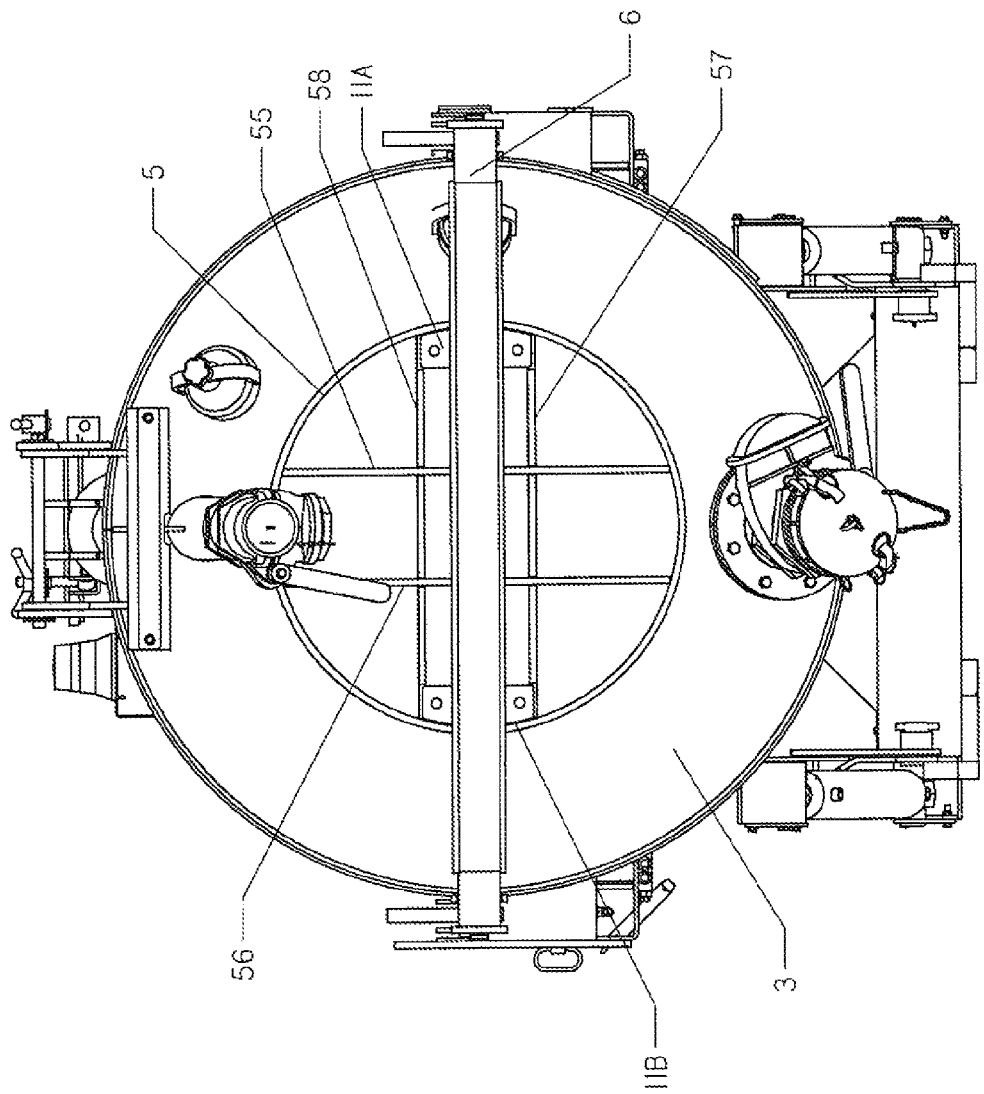
FIG. 8 is a front view of an alternative embodiment of the vacuum tank door shown in FIG. 1.
Figure 9:
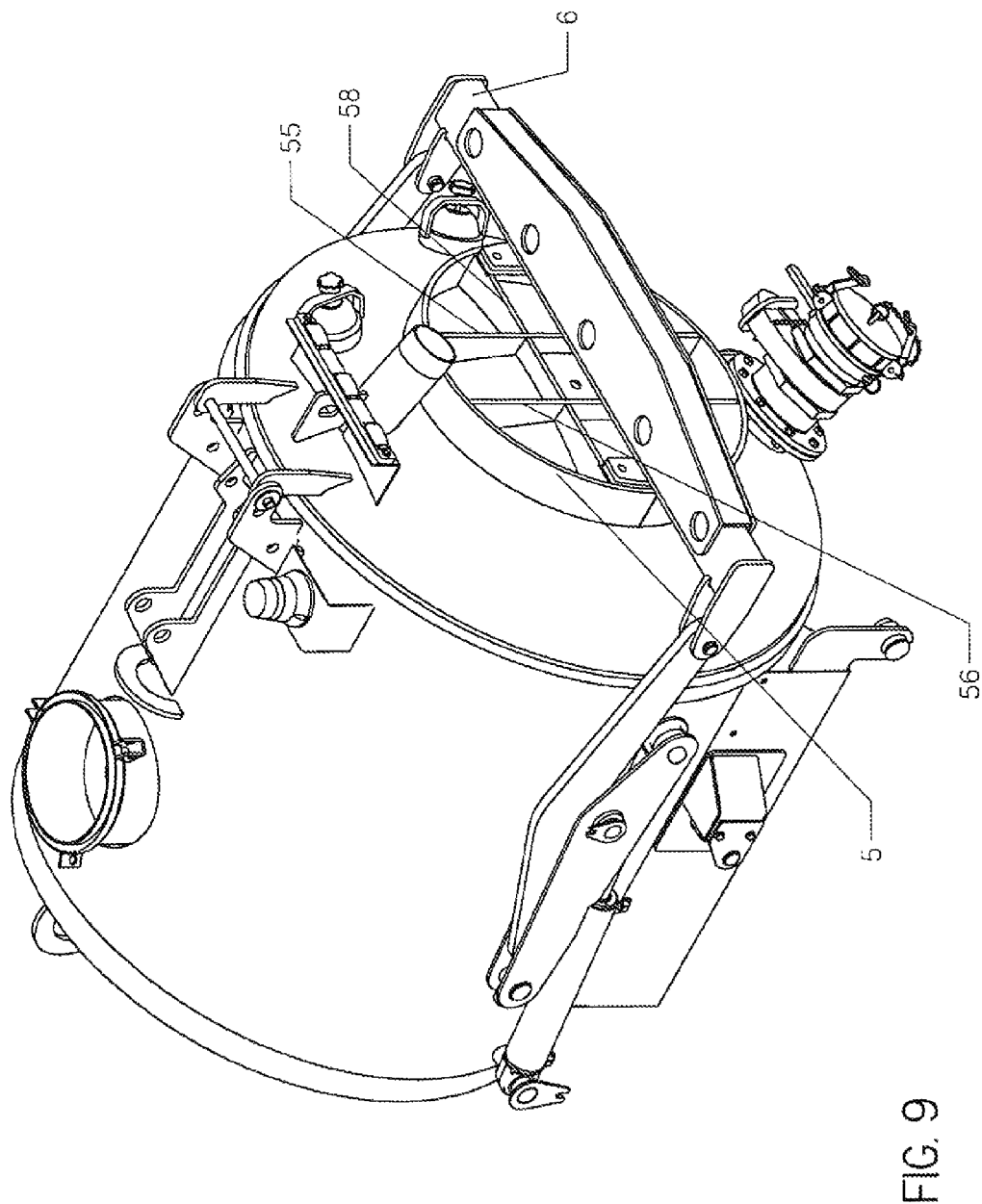
FIG. 9 is a perspective view of the vacuum tank and the sealed closed vacuum tank door of FIG. 8.

Turning to FIGS. 8 and 9, an alternative embodiment of the tank door sealing mechanism is shown. The embodiment of FIGS. 8 and 9 utilizes two vertical bars 55 and 56 and two horizontal bars 57 and 58. Horizontal bars 57 and 58 are made of three pieces each and extend across the door within the circular flange 5. The horizontal cross bars 57 and 58 are welded to the inside of the circular flange 5. Brackets 11A and 11B are welded to the horizontal bars 57 and 58 and provide attachment points for the cross bar 6. Vertical bars 55 and 56 extend inside the diameter of the circular flange 5 across the horizontal bars 57 and 58.

Connecting the horizontal crossbar 6 to the tank door 2 in two places, as shown in FIGS. 1, 6, and 8, works to ensure an even seal around the periphery of the door. When the tank door 2 is in the closed position, the horizontal crossbar 6 exerts pressure on the tank door. By connecting the horizontal crossbar 6 to the tank door 2 in two different places on the circular flange 5, the pressure exerted on the tank door 2 remains balanced around the door ensuring the integrity of the tank door 2 and seal when the tank door 2 is closed.

Figure 2:
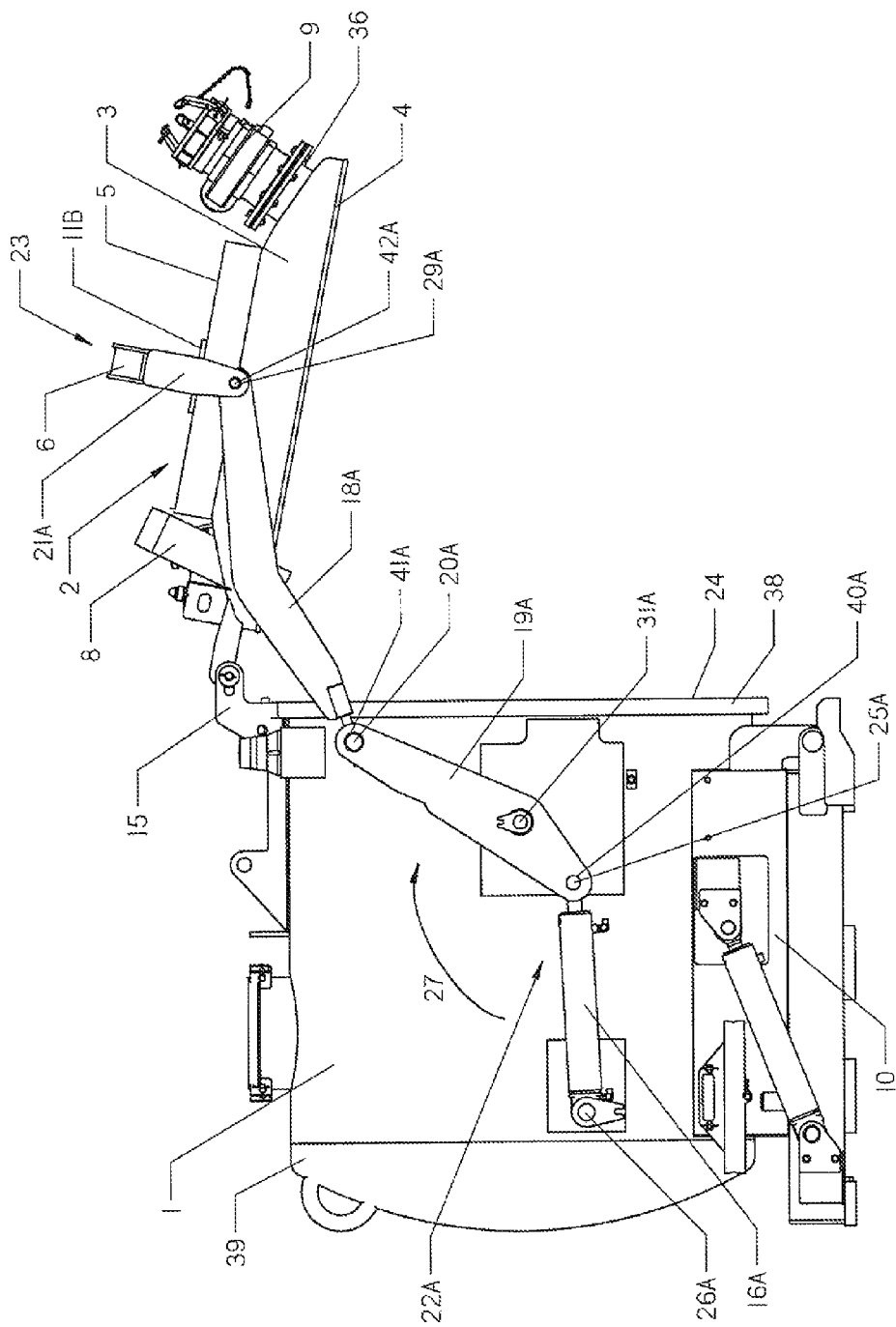
FIG. 2 is a side view of the vacuum tank and tank door of FIG. 1. The tank door is shown completely open. The door lifting assembly is shown completely extended and functioning to hold the door in an open position.
Figure 5:
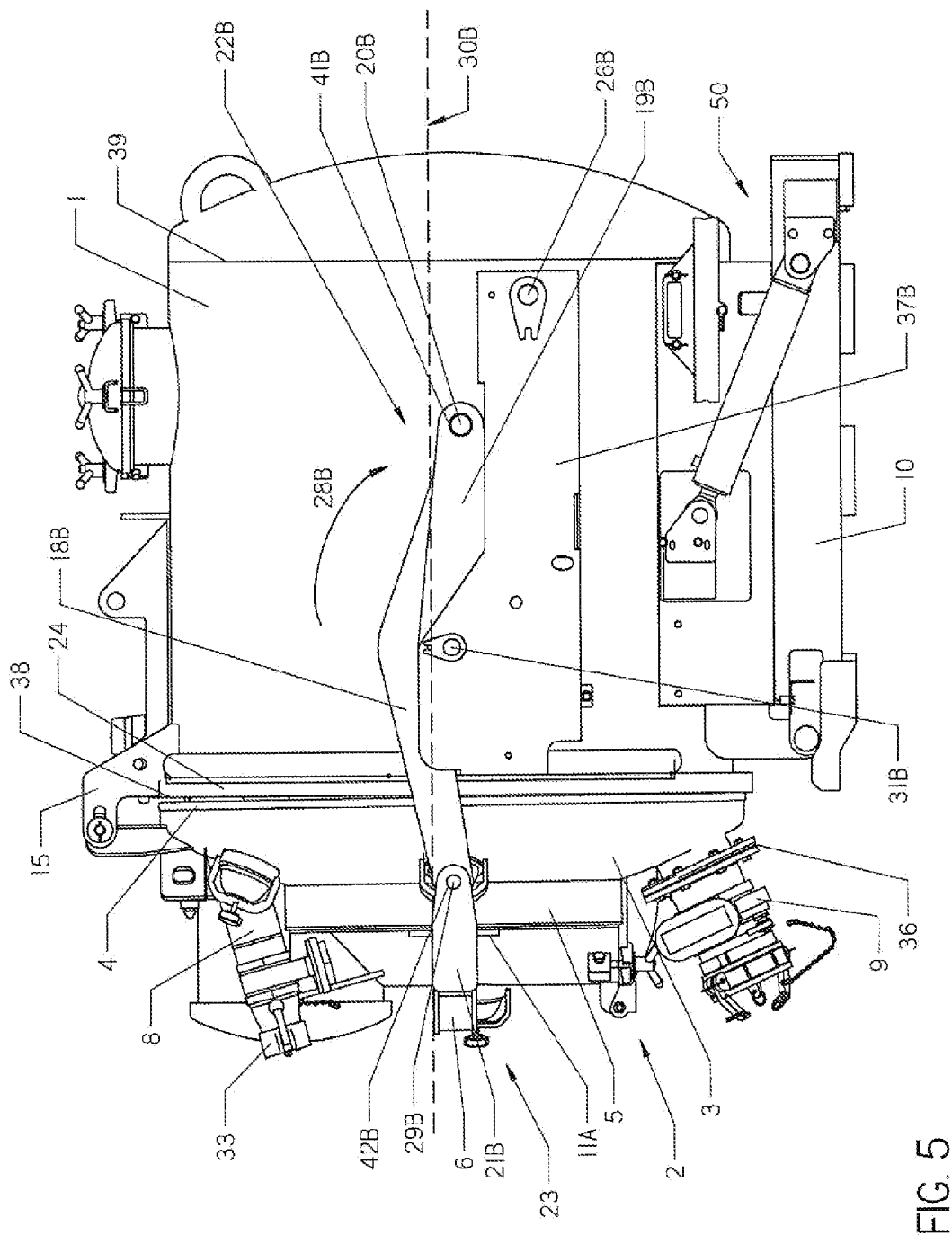
FIG. 5 is a side view of the opposite side of the vacuum tank shown in FIG. 4. The vacuum tank is shown resting on a mounting bracket and the door lifting assembly is shown in its compacted position holding the door against the tank. A hydraulic lifting assembly is also shown attached to the mounting bracket.

Pressure is exerted on the horizontal crossbar 6 by the lifting assembly 22A seen in FIG. 1, which connects to both ends of the horizontal crossbar 6 next to the outer edges of the tank door 2. The lifting assembly 22A, as shown in. FIG. 2, facilitates hydraulic raising and lowering of the tank door 2. The lifting assembly 22A comprises a cylinder 16A, a piston 17A, an upper linkage arm 18A, a lower linkage arm 19A, a crossbar linkage arm 21A, pivot pins or connection points 20A, 25A, and 29A, and rotating pin 31A. The lifting assembly 22A is shown in the closed locked position functioning to seal the tank door 2 shut in FIG. 1. An identical lifting assembly 22B may be positioned on the opposite side of vacuum tank 1 as shown in FIG. 5. One skilled in the art will recognize that the lifting assembly 22B (FIG. 5) functions identical to the lifting assembly 22A as described in FIGS. 1 and 2. Lifting assembly 22A and 22B work simultaneously to open and close the tank door 2. The tank door also has a discharge door sealing flange 4 that meets the vacuum tank sealing flange 24 when the door is in the closed and sealed position to help ensure a tight seal. The vacuum tank sealing flange 24 is attached to the vacuum tank 1. A gasket or rubber seal (not shown) may be attached to either flange to make the seal air tight.

In reference to FIG. 2, cylinder 16A, within the lifting assembly 22A, is rigidly mounted to the vacuum tank 1 via a cylinder mounting hole 26A. The cylinder 16A houses a piston 17A, shown in FIG. 1, which is attached via pivot pin 25A to the lower linkage arm 19A. The lower linkage arm 19A attaches to the upper linkage arm 18A via pivot pin 20A. The upper linkage arm 18A is then attached to the crossbar linkage arm 21A via pivot pin 29A. The upper, lower, and crossbar linkage arms 18A, 19A, and 21A and piston 17A contain holes 40A, 41A, and 42A for accepting these pivot pins. The crossbar linkage arm 21A is rigidly attached to the horizontal crossbar 6. The lower linkage arm 19A is also attached to the vacuum tank 1 via a rotating pin 31A which is welded to the side of the vacuum tank 1.

In operation, the hydraulic cylinder 16A is at a starting position when the piston 17A is extended out of the cylinder 16A, as shown in FIG. 1, and the tank door 2 is closed. When the hydraulic cylinder 16A has been pressurized using hydraulic fluid to retract the piston 17A into the cylinder 16A, as shown in FIG. 2, the lower linkage arm 19A extends upwards in direction of the arrow 27. When the piston 17A forces the lower linkage arm 19A to extend upwards, the upper linkage arm 18A extends upwards as well forcing the tank door 2 open. The tank door 2 is connected to the top of the vacuum tank 1 via a hinge 15. The tank door 2 extends out from the top of the vacuum tank 1 at the hinge 15 when the tank door 2 is fully opened. Full extension of the linkage arms exposes the interior of the vacuum tank.

To close the tank door 2, the hydraulic cylinder 16A is pressurized so that the piston 17A extends from the cylinder 16A causing the lower linkage arm 19A to fold backwards about pivot pin 31A in the direction of arrow 28A in FIG. 1. As the lower linkage arm 19A begins to fold backwards, the upper linkage arm 18A collapses forward at pivot pin 20A, in the direction of arrow 27 in FIG. 2. Upper linkage arm 18A collapses forward until it comes to rest directly on top of the lower linkage arm 19A as shown in FIG. 1. This forward movement also causes the upper linkage arm 18A to rotate around pivot pin 29A as it pulls the tank door 2 back to a closed position. When the upper and lower linkage arms 18A and 19A are completely folded, the tank door is sealed and the upper linkage arm 18A sits substantially parallel to the crossbar linkage arm 21A. The lower linkage arm 19A extends and retracts to initiate the opening and closing of the tank door 2 all while rotating around the rotating pin 31A.

FIG. 1 also demonstrates how the lower linkage arm 19A and upper linkage arm 18A fold at pivot pin 20A to rest "over-center" in regards to horizontal line 30A (also shown in FIG. 4) when the tank door 2 is closed. In this position, the linkage biases the tank door 2 in the closed position should the cylinders 16A and 16B fail. Because pivot points 20A and 20B are folded and rotated beyond over-center, lower linkage arms 19A and 19B cannot rotate or extend in a direction opposite arrows 28A (FIGS. 1 & 4) and 28B (FIG. 5) unless they are actively biased in those directions to a point above horizontal line 30A (FIG. 4) and 30B (FIG. 5). As a result, in this position, the door is considered sealed since an active force is required to force the linkage arms back over-center and into the open position.

The lifting assemblies 22A and 22B respond identically at substantially the same time to fold and rotate the linkage arms over-center to close the door 2. Together, the assemblies force the tank door 2 against the vacuum tank 1 by applying a load upon the tank door 2 that is opposed only by forcing the linkage arms back over-center. The cylinder is shown in FIGS. 1, 2, 4, and 5 as being mounted horizontally to the side of the vacuum tank 1; however, one skilled in the art would appreciate that this cylinder may also be mounted in a more vertical position closer to the tank door 2 because this position still allows the lifting assembly 22A and 22B to rotate to over-center.

Turning now to FIG. 3, a front view of the sealed tank is shown. FIG. 3 illustrates the position of the brackets 11A and 11B with regard to the horizontal crossbar 6. FIG. 3 also shows a collection tank inlet 8 positioned just above the vertical bar 7 outside of the center circular flange 5. When a vacuum is produced in vacuum tank 1, a vacuum air stream may be pulled through the vacuum tank inlet 8. When inlet 8 is not closed off by a plug 33, the inlet may be connected to a hose (not shown) leading to digging tools (not shown). One skilled in the art will also recognize that the vacuum tank inlet 8 may also be placed on either side of the vacuum tank 1. Placing the vacuum tank inlet 8 on the face of the tank door 2 may provide for less expensive repair of the inlet 8 by only having to fix the tank door 2 rather than the entire vacuum tank 1. FIG. 3 also shows two sight eyes 60 on the tank door which allow the operator to view the level of fluid within the tank. A safety strobe light 61 is also shown at the top of the tank.

FIG. 3, as well as FIGS. 1, 2, 4, and 5, show a flange 36 on the face of the tank door 2. The flange 36 supports a gate valve 9 to allow draining of the liquid portion of the slurry in the vacuum tank 1 without requiring the door to be opened. Gate valve 9 may also be used to introduce air into the vacuum tank 1 to reduce the vacuum in the tank so that the door may be opened. A sediment collector 35 is also shown in FIG. 3 attached to the side of the vacuum tank 1. The sediment collector 35 collects any debris or rocks that are pulled into the vacuum tank 1 via the vacuum tank inlet 8.

Figure 4:
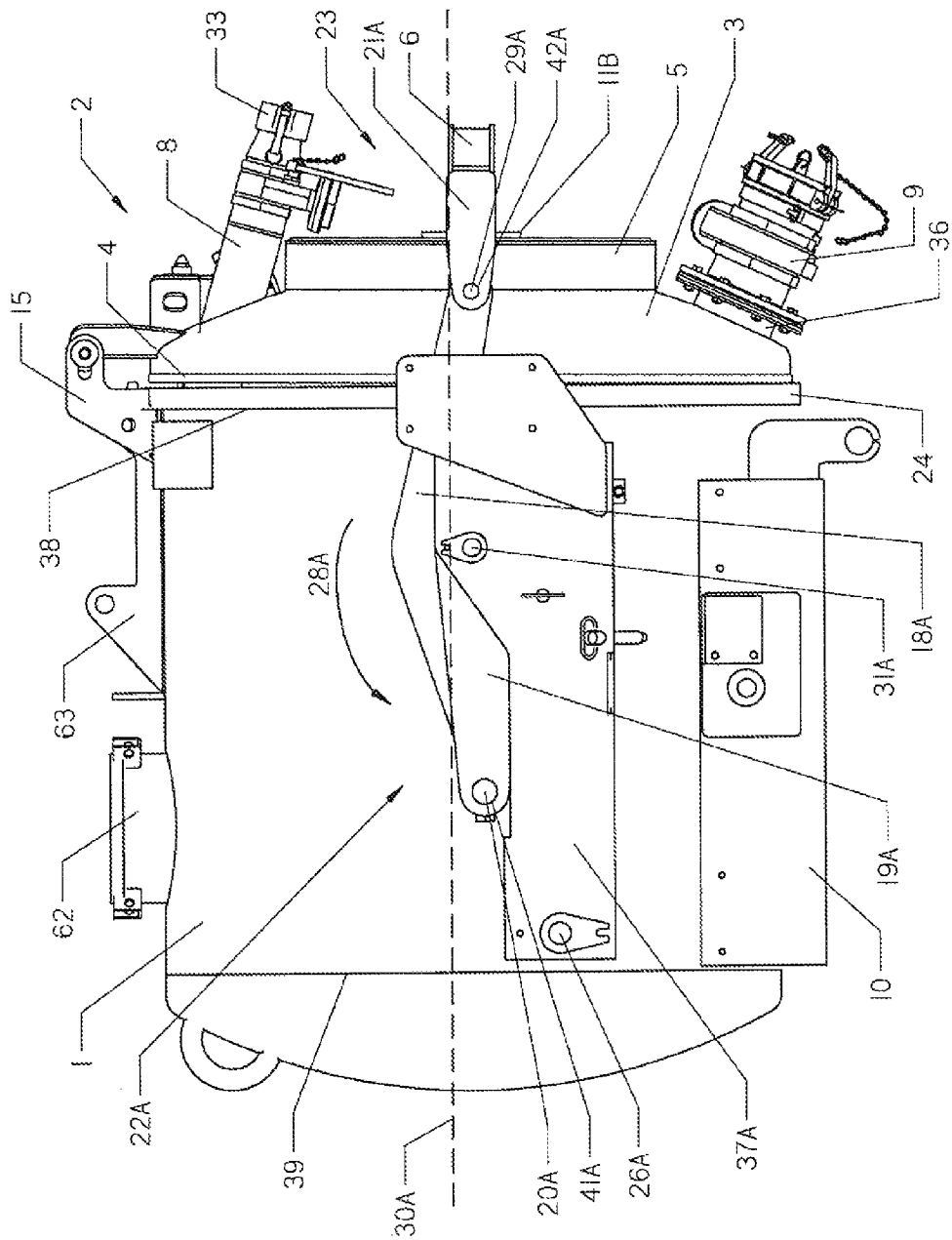
FIG. 4 is a side view of the vacuum tank with the tank door closed. The vacuum tank is shown resting on a mounting bracket and the door lifting assembly is shown in its compacted position to cause the door to close the tank.

FIG. 4 represents another side diagrammatical view of the vacuum tank 1 with the vacuum tank door 2 sealed closed. This view shows the same side shown in FIGS. 1 and 2. However, in FIG. 4 a guard bracket 37A is shown. The cylinder 16A and piston 17A are not shown in FIG. 4 because they are positioned behind the guard bracket 37A. The guard bracket 37A is used to support and protect various components of the lifting assembly. An identical guard bracket 37B is shown on the opposite side of the vacuum tank in FIG. 5. FIG. 4 also shows the shut off lid 62 utilized to stop suction within the tank with the tank is full. A cylinder plate 63 is also shown at the top of the tank.

Turning to FIG. 5, the opposite side of the tank shown in FIGS. 1, 2 and 4 is shown. The lifting assembly 22B shown is identical to the lifting assembly 22A shown in FIGS. 1, 2, and 4. Cylinder 16B and piston 16B are not shown; rather, the guard bracket 37B they are disposed behind is shown. As in FIG. 4, pivot pin 20B is shown over-center below the horizontal line 30B.

The above described embodiments of the lifting assemblies 22A and 22B and the sealing mechanism 23 provide several advantages. First, rotating the lower linkage arm 19A and 19B over-center maximizes the amount of sealing force exerted by the horizontal crossbar 6 upon the tank door 2. Second, placing the lower linkage arms in the over-center position biases the door in the closed position. Third, the ability of the linkage arms 18A, 18B, 19A, and 19B to fully extend allows the tank door 2 to open widely making the interior of the vacuum tank 1 easily accessible.

Finally, connecting the horizontal crossbar 6 in two different places to the circular flange 5 by brackets 11A, 11B, 32A, and 32B, ensures that the horizontal crossbar 6 exerts a balanced force on the tank door 2. This reduces the likelihood of dimpling or deforming of the tank door 2 that would compromise the door's seal. Further, connecting the horizontal crossbar 6 in two places to the tank door 2 provides for an even seal around the circumference of the tank door 2.

It should be appreciated by those skilled in the art that various modifications and variations can be made in the present invention without departing from the scope and spirit of the invention. It is intended that the present invention cover such modifications and variations as come within the scope and spirit of the appended claims and their equivalents.

What is claimed is:

1. A sealing mechanism for sealing a vacuum tank, the vacuum tank comprising a door panel having a center point, and a tank, the sealing mechanism comprising;
    a ring flange attached to an outer surface of the door panel;
    a horizontal crossbar connected to the ring flange and disposed proximate the center point of the door panel; and
    a lifting assembly attached to the horizontal crossbar, the lifting assembly comprising:
        an upper linkage arm connected to the horizontal crossbar;
        a lower linkage arm, having a first end and a second end, the lower linkage arm comprising a connection point disposed in between the first end and the second end, wherein the lower linkage arm is connected to the tank at the connection point; and
        a hydraulic cylinder connected to the second end of the lower linkage arm;
    wherein activation of the hydraulic cylinder causes a connection point of the lower linkage arm and the upper linkage arm to move over-center of the connection point.

2. The sealing mechanism of claim 1 wherein the ring flange is spaced-apart from the center point of the door panel and wherein a center of the ring flange is disposed at the center point of the door panel.

3. The sealing mechanism of claim 2 wherein the ring flange extends outward from the door panel and has an inner surface, a pair of brackets are connected to the inner surface of the ring flange, and wherein the horizontal crossbar is connected directly to the brackets.

4. The sealing mechanism of claim 1 wherein the ring flange further comprises a bracket spaced apart from the center point of the door panel, and wherein the horizontal crossbar is connected directly to the bracket.

5. The sealing mechanism of claim 1 wherein the door panel comprises a circular dome having a diameter, wherein the center point comprises the apex of the circular dome; and wherein the horizontal crossbar is parallel to the diameter of the door panel.

6. The sealing mechanism of claim 1 wherein the door panel is circular, and wherein the ring flange is attached to the door panel so it is positioned beyond a circle defined by a midpoint of a radius of the door panel and equidistant from the center point of the door panel.

7. A sealing mechanism for sealing a vacuum tank comprising:
    a circular dome shaped door having a diameter and an apex;
    a ring flange attached to an outer surface of a door, wherein the ring flange comprises at least two brackets spaced apart from the apex;
    a horizontal crossbar connected directly to the at least two brackets of the ring flange; and
    a lifting assembly attached to the horizontal crossbar, the lifting assembly comprising:
        an upper linkage arm connected to the horizontal crossbar;
        a lower linkage arm connected to the tank; and
        a hydraulic cylinder connected to the lower linkage arm;

wherein activation of the hydraulic cylinder causes a connection point of the lower linkage arm and the upper linkage arm to move over-center of the connection between the lower linkage arm to the tank.

8. The sealing mechanism of claim 7 the lower linkage arm comprises a first end, a second end, and a connection point disposed between the first end and the second end; the second end being connected to the hydraulic cylinder and wherein the lower linkage arm is connected to the vacuum tank at the connection point.

9. The seating mechanism of claim 8 wherein a first end of the hydraulic cylinder is connected to the vacuum tank and a second end of the hydraulic cylinder is connected to the second end of the lower linkage arm, wherein the hydraulic cylinder is disposed in a substantially horizontal orientation.

10. The sealing mechanism of claim 9 wherein the ring flange is attached to the door so it is positioned beyond a circle defined by a midpoint of a radius of the door and equidistant from the apex.

11. A vacuum system comprising:
a tank having an open end and a closed end;
a door used to close the open end of the tank, the door having on outer surface and a diameter;
a horizontal crossbar connected to the outer surface of the door;
a ring flange attached to the outer surface of the door; wherein the horizontal crossbar is connected to the ring flange; and
a door assembly comprising:
an upper linkage arm connected to the horizontal crossbar;
a lower linkage arm, having a first end and a second end, the lower linkage comprising a connection point disposed between the first end and the second end, wherein the lower linkage arm is connected to a side of the tank at the connection point; and
a hydraulic cylinder connected to the second end of the lower linkage arm;
wherein activation of the hydraulic cylinder causes a connection of the lower linkage arm and the upper linkage arm to move over-center of the connection point.

12. The vacuum system of claim 11 wherein the door comprises a circular dome having a diameter and an apex, wherein the horizontal crossbar is disposed along the diameter of the door.

13. The vacuum system of claim 12 wherein the ring flange is spaced apart from the apex of the door.

14. The vacuum system of claim 13 further comprising a plurality of brackets connected to an inside of the ring flange, wherein the horizontal crossbar is connected to the plurality of brackets.

15. The vacuum system of claim 14 wherein a first end of the hydraulic cylinder is connected to the tank and a second end of the hydraulic cylinder is connected to the second end of the lower linkage arm, wherein the hydraulic cylinder is disposed in a substantially horizontal orientation.

16. The vacuum system of claim 15 wherein the ring flange is attached to the outer surface of the door so it is positioned beyond a circle defined by a midpoint of a radius of the door and equidistant from the apex.

* * * * *

UNITED STATES PATENT AND TRADEMARK OFFICE
CERTIFICATE OF CORRECTION

| | | |
|---|---|---|
| PATENT NO. | : 9,057,180 B1 | Page 1 of 1 |
| APPLICATION NO. | : 13/434349 | |
| DATED | : June 16, 2015 | |
| INVENTOR(S) | : Sewell | |

It is certified that error appears in the above-identified patent and that said Letters Patent is hereby corrected as shown below:

IN THE CLAIMS

Column 7, claim 9, line 11, please delete "seating" and substitute therefore --sealing--.

Signed and Sealed this
Sixth Day of October, 2015

Michelle K. Lee
*Director of the United States Patent and Trademark Office*